United States Patent [19]

Hoag

[11] Patent Number: 4,723,256
[45] Date of Patent: Feb. 2, 1988

[54] OPTICAL RESONATOR FOR LASER OSCILLATING APPARATUS

[75] Inventor: Ethan D. Hoag, Boston, Mass.
[73] Assignee: Laser Corporation of America, Lowell, Mass.
[21] Appl. No.: 841,768
[22] Filed: Mar. 20, 1986
[51] Int. Cl.⁴ .............................................. H01S 3/081
[52] U.S. Cl. ........................................ 372/93; 372/92; 372/107
[58] Field of Search ..................... 372/93, 92, 99, 107; 350/617, 623

[56] References Cited

U.S. PATENT DOCUMENTS 2,378,396  6/1945  Fassin .................................. 350/617

4,504,956  3/1985  Ream ...................................... 372/99

Primary Examiner—James W. Davie
Assistant Examiner—Xuan Vo
Attorney, Agent, or Firm—William W. Habelt

[57] ABSTRACT

An optical resonator for a laser oscillating apparatus has an arrangement of folding mirrors facing one another across the lasing gas medium that radiates the laser beam. The arrangement includes a pair of reflecting surfaces that are approximately orthogonal to one another and effectively face the lasing gas medium as a whole. Also, the laser beam that is incident from the lasing gas medium is caused to be reflected successively from both reflecting surfaces to be emitted in the direction of the lasing gas medium.

4 Claims, 10 Drawing Figures

OPTICAL RESONATOR FOR LASER OSCILLATING APPARATUS

BACKGROUND OF THE INVENTION

The present invention relates to an optical resonator for laser oscillating apparatus, and in more detail, to an optical resonator whose optical axis remains substantially unchanged even when the light path of the laser beam is distorted due to temperature change or the like in the lasing gas medium, and moreover, permits to obtain a polarized laser beam.

In recent years, various attempts have been given in order to obtain a laser oscillating apparatus which is small in size and has a high output power.

As one such oscillating apparatus, there exists one in which the optical resonator is composed of a primary mirror, an output mirror, and an appropriate number of folding mirrors.

In this device it is attempted to reduce the length of the resonating cavity by multiply folding a laser beam that travels back and forth between a primary mirror and an output mirror by means of the folding mirrors that are placed to intervene the beam path, so as to let the laser beam pass through the lasing gas medium for many times.

An exmaple of such a structure is, for example, to place a relatively large front folding mirror at one end of the lasing gas medium, to arrange a somewhat small primary mirror and a semi-transmissive output mirror in the vicinity of the front folding mirror, and to arrange a rear folding mirror at the other end of the lasing gas medium so as to oppose the front folding mirror and others. Such as optical resonator is disclosed in Applicant's co-pending application Ser. No. 741,756, filed June 6, 1985, "for Gas Laser Having Thermally Stable Optical Mount."

In this optical resonator, a ray of radiation which is reflected by the primary mirror on one end of the lasing gas medium passes through the lasing gas medium to reach the rear folding mirror on the other side. After being reflected from the rear folding mirror, the ray reaches the front folding mirror on the first end via again the lasing gas medium. Thereafter, the ray is reflected many times between the front folding mirror and the rear folding mirror, and eventually reaches the output mirror on the first end from the rear folding mirror on the other end of the lasing gas medium.

According to the optical resonator, there are formed multiple light paths between the front folding mirror and the rear folding mirror, to give an effective light path which is several times the length of the optical resonator. This then permits to realize a laser oscillating apparatus of small size and high output power.

Now, in a laser oscillating apparatus of the above kind, there was a problem that when a nonuniformity in the spatial distribution of temperature in the lasing gas medium is produced due to supply of energy by a pumping drive, the light path of the laser beam is distorted, resulting in a situation in which it is not possible to output a predetermined laser beam.

Furthermore, when a polarized beam is desired for use, for example, in high precision laser processings, there was a problem in that it is required to insert a special light polarizing means in the optical resonator.

SUMMARY OF THE INVENTION

An object of the present invention is to provide an optical resonator for laser oscillating apparatus which is capable of suppressing the deviation in the optical axis to a minimum even when there is caused a distortion in the optical path in the optical resonator by the generation of a deviation in the spatial distribution of temperature in the lasing gas medium.

Another object of the present invention is to provide an optical resonator for laser oscillating apparatus which is capable of producing a polarized laser beam without specifically inserting light polarizing means in the optical resonator.

Still another object of the present invention is to provide an optical resonator for laser oscillating apparatus which is capable of suppressing the deviation of the optical axis to a minimum, when the laser oscillating apparatus is chosen to be a gas laser oscillating apparatus of three orthogonal axis type and the optical path is distorted due to large temperature difference in the direction of the gas flow.

In order to attain the above objects, there is employed in the present invention orthogonal type folding mirrors in which a pair of reflecting surfaces that are approximately mutually orthogonal are arranged to face the lasing gas medium, as a part of the folding mirror for the optical resonator, the laser beam incident from the direction of the lasing gas medium is caused to be reflected successively from both reflecting surfaces, and the reflected beam is arranged to be sent out in the direction of the lasing gas medium.

DETAILED DESCRIPTION OF THE PREFERRED EMBODIMENT OF THE INVENTION

Figure 1:
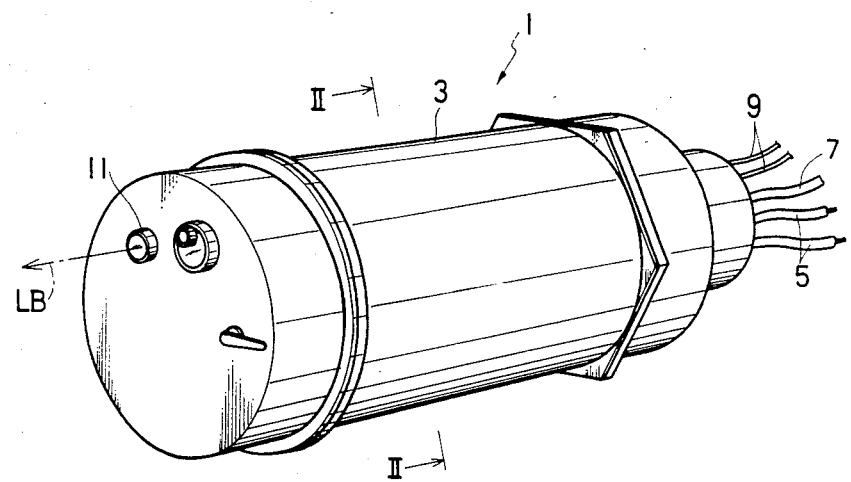
FIG. 1 is a perspective view of the laser oscillating unit which represents the principal part of the laser oscillating apparatus.

As shown in FIG. 1, the laser oscillating unit 1 is constructed by storing the laser oscillating elements in a cylindrical laser housing 3. The laser oscillating device comprises the oscillating unit 1 and a control unit that controls the oscillating unit 1. On the right-side surface of the laser housing 3 there are connected numerous connecting members such as the power source lines 5, a gas supply tube 7 for supplying a mixed gas of $CO_2$, He, $N_2$, and others, and the cooling water pipes 9 for internal cooling. On the left-side surface of the laser housing 3 there is formed an output window 11 for the laser beam LB.

Figure 2:
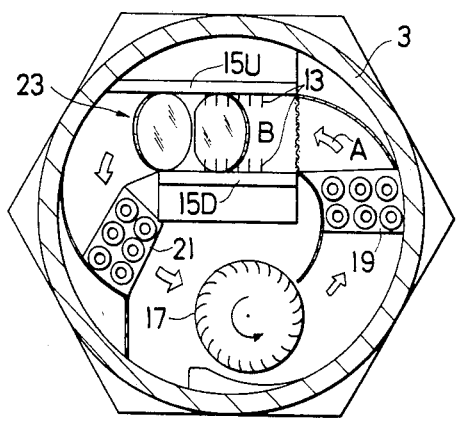
FIG. 2 is an explanatory diagram of the cross-section as seen from the direction of arrows II—II in FIG. 1.

As shown in FIG. 2, in the upper part of the inside of the laser housing 3, there are provided a pair of upper and lower discharge electrodes 15U and 15D that have numerous pin-shaped electrodes 13 with a prescribed separation between them, along the longitudinal directions of the laser housing 3. Underneath these discharge electrodes 15U and 15D there is provided a blower 17 which is rotated in the counterclockwise direction, in FIG. 2 to generate a gas flow A in the counterclockwise direction in the laser housing 3.

Between the blower 17 and the lasing space B that is formed by the pair of upper and lower discharge electrodes 15U and 15D, there are provided heat exchangers 19 and 21. Between the blower 17, the heat exchangers 19 and 21, or the discharge electrodes 15U and 15D, there are appropriately provided partitioning plates for smoothing the gas flow A. In the interior of the laser housing 3, there are arranged a primary mirror 25, a front folding mirror 27, and an output mirror 29 (any of which is not shown in FIG. 2) and an orthogonal type rear folding mirror 23 on the front and the rear sides, respectively, with the lasing space B in between.

Figure 3:
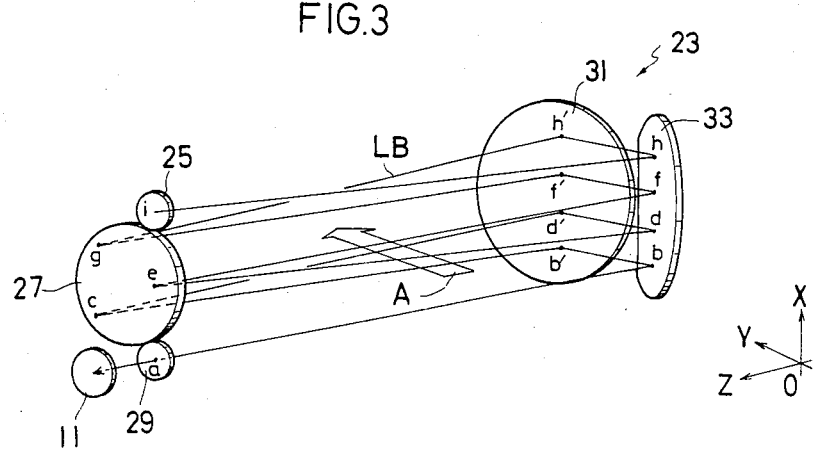
FIG. 3, FIG. 4 and FIG. 5 are an explanatory perspective view, an explanatory plan view, and an explanatory side view, respectively, of the optical resonator.

As shown in FIG. 3 in detail, on the output side of the laser oscillating unit 1, there is arranged a front folding mirror 27 that consists of a relatively large plane mirror, and in addition, there are arranged a primary mirror 25 which consist of concave mirror totally reflective and an output mirror 29 that consists of a plane mirror with transmissivity of about 40% above and below, respectively, on the right-hand side of the front folding mirror 27. Further, on the rear side of the laser housing 3, there is arranged an orthogonal-type folding mirror 23, facing the front folding mirror 27.

The orthogonal-type folding mirror 23 consists of two plane reflecting mirrors 31 and 33 that are supported orthogonal to each other by means of a suitable supporting means. The orthogonally situated reflecting surfaces are arranged directly opposing the front folding mirror 27, with the intersecting line of the surfaces perpendicular to the direction Y of the gas flow. However, the posture of direction opposition does not have to be very exact.

With reference to the coordinate system formed by the X, Y and Z axes the primary mirror 25 and the output mirror 29 in the present example are arranged with an attitude that has a predetermined angle inclined with respect to the X-axis attitude of the front folding mirror 27.

Figure 4:
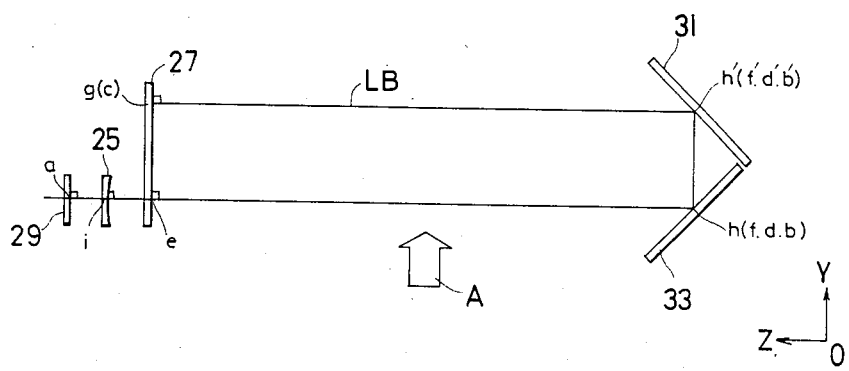
Figure 5:
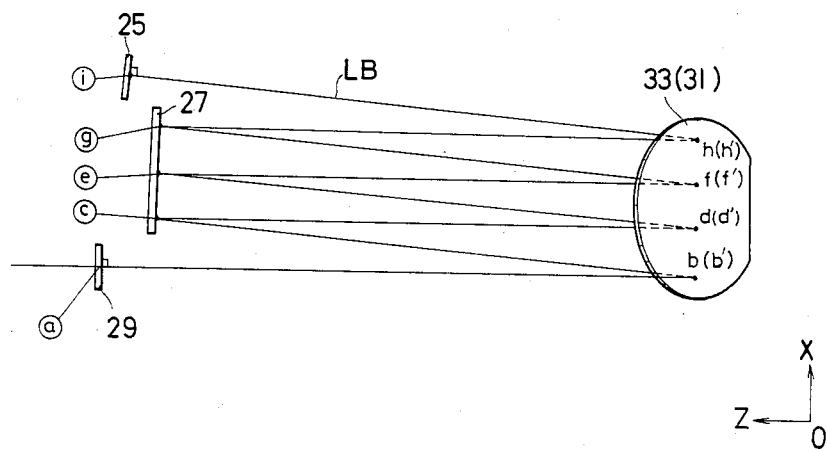

As shown in FIG. 3 to FIG. 5, the laser beam LB is, after reflected at a reflecting point i on the primary mirror 25, reflected successively at reflecting points h and h' on the rear folding mirror 23, and get to a reflecting point g on the front folding mirror 27. Thereafter, it arrives at a reflecting point a on the output mirror 29 through each of the reflecting points f'→f→e→d→d'→c→b'→b on the rear folding mirror 23 or on the front folding mirror 27.

Therefore, in this optical resonator, the optical path that connects the reflecting point i on the primary mirror 25 and the output point a on the output mirror 29, is folded three-dimensionally for eight times between the front folding mirror 27 and the rear folding mirror 23.

When discharge is started by the supply of a laser medium which is a mixture of $CO_2$, $N_2$, He, to the space between the discharge electrodes 15U and 15D, radiation is emanated from the mixed gas. Then, the radiation is amplified successively as it propagates along the optical path shown in FIG. 3, and a desired laser beam is output from the output window 11.

In this example, the optical path is folded for eight times by the optical resonator, as mentioned in the above, it becomes possible to reduce the length of the optical resonator to an extremely small value. Moreover, the folded optical path is designed to be arranged three-dimensionally in the optical resonator, as shown in FIG. 3, the diameter of the cross-section of the optical resonator can be made extremely small. Hence, it becomes possible in this embodiment to realize a laser oscillating unit which is small in size for both of the longitudinal and the lateral directions, and yet is possible to output a large power.

Moreover, the radiation which is emitted from the laser medium is reflected with an approximate reflection angle of 45° by each of the first and second reflecting mirrors 31 and 33, so that it becomes possible to obtain a laser beam of a desired polarization.

Figure 6:
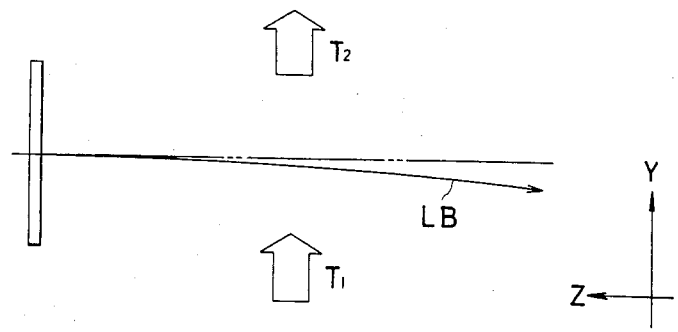
FIG. 6, FIG. 7, and FIG. 8 are all explanatory diagrams for depicting the optical path of the laser beam in optical resonators.
Figure 7:
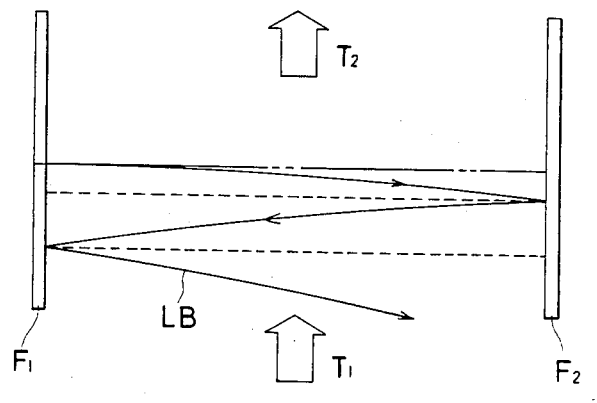
Figure 8:
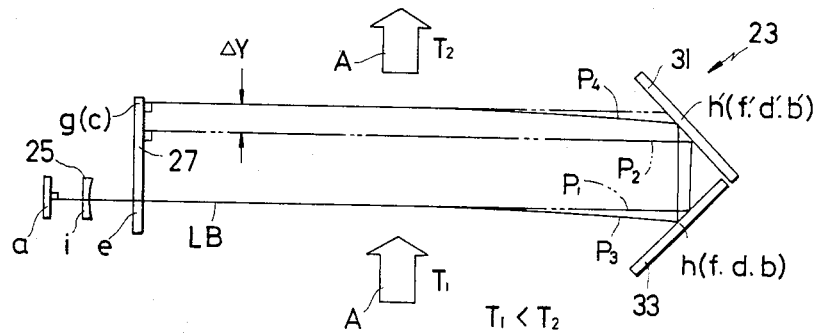

Now, as discharge proceeds in the optical resonator, there is generated a large amount of heat which will lead to a marked difference in the temperature on the upstream side and that on the downstream side of the blow of gas that constitutes the laser medium. (If the temperatures on the upstream and downstream sides of the gas flow are designated by $T_1$ and $T_2$, respectively, there will hold a relation $T_1 < T_2$.) Then, due, for example, to the changes in the refractive index of the medium, the optical path of the laser beam will be distorted toward lower temperature (namely, $T_1$) side, as indicated in FIG. 6. In such a case, in the conventional optical resonator in which a pair of folding mirrors $F_1$ and $F_2$ are arranged on both sides of the laser oscillating region, the optical path will be distorted markedly in each time the laser beam LB is reflected from the folding mirror, as shown in FIG. 7, so that the alignment of the optical system will get out of order markedly.

In contrast to that, in the present embodiment, an orthogonal rear folding mirror 23 which has a first and a second reflecting mirrors 31 and 33 is provided on one end of the optical resonator. Thus, for example, if the optical path for a light that is incident upon the reflecting mirror 33 follows a route which consists of the distorted optical paths $P_3$ and $P_4$ with respect to the distortion-free optical paths $P_1$ and $P_2$, then the optical path of the light that is reflected from the first reflecting mirror 31 will follow a distorted optical path $P_4$ that is parallel to $P_3$.

Here, the optical path $P_4$ will be bent toward the lower temperature (namely, $T_1$) side of the gas flow A, entirely similarly to the incident optical path $P_3$, in accordance with the law of reversibility of propagation path of light, so that it will propagate parallel to the distortion-free optical path $P_2$ when it arrives at the folding mirror 27. Such a phenomenon of eliminating distortion will be identically operative also in the case of repetition of a plurality of reflections.

Accordingly, in the optical resonator shown in the present example the ultimate deviation of the optical axis, for example, the deviation corresponding to the slight deviation $\Delta Y$ in the optical paths $P_2$ and $P_4$ on the surface of the front folding mirror 27, will become a maximum.

Hence, according to the present embodiment, even if the optical path of the laser beam is distorted due to generation of a deviation in the spatial distribution of temperature in the laser medium, it becomes possible to minimize the mismatch in the alignment of the optical system.

Figure 9:
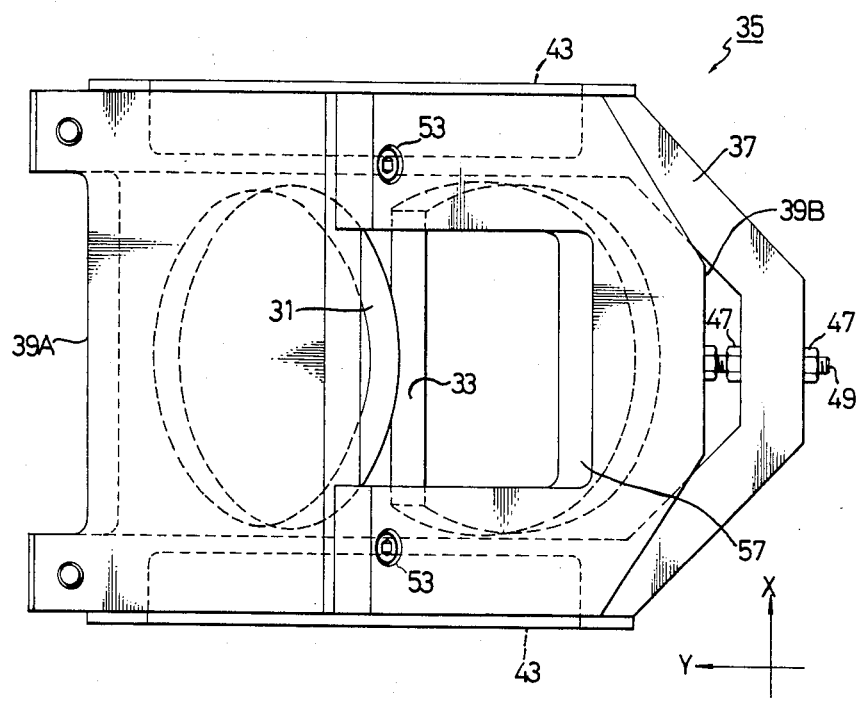
FIG. 9 and FIG. 10 are a plan view and a front view, respectively, of the orthogonal type folding mirrors.
Figure 10:
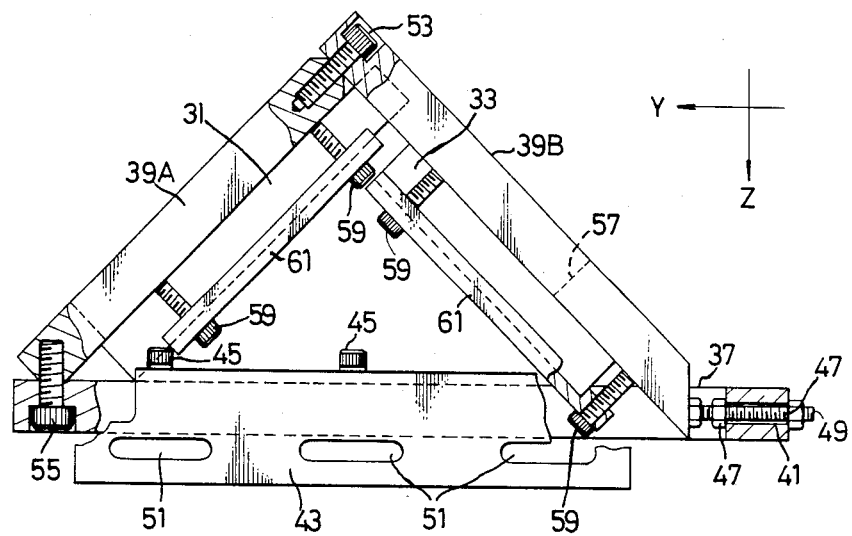

FIG. 9 and FIG. 10 show a plan view and a front view, respectively, of a mirror supporting device for supporting the rear folding mirror 23.

The mirror supporting device 35 comprises principally a substrate member 37 and a rectangular isosceles member 39 (namely, 39A and 39B) that is mounted on the substrate member 37.

The substrate member 37 consists of a U-shaped plate member. On the base section of the U-shaped plate member there is provided a through hole 41, and on the parallel arm section of the letter U there are fixed with bolts 45 fixing units 43 for holding the substrate member 37 in laser housing, with its position freely adjustable. Fixed to the through hole 41, with its hoard section arranged in the interior of the letter U by using two nuts 47 for positioning, is a bolt 49. On the fixing unit 43 these are provided oblong apertures 51, and the position of the substrate member 37 is adjustable in the direction of gas flow Y in the laser housing, by loosening or fastening the bolts, not shown, that are inserted through the oblong apertures 51.

The rectangular isosceles member 39 (39A and 39B) is constructed by joining, with bolts 53, two mirror mounting plates 39A and 39B placed so as to include an angle of approximately 90°, or more precisely, to form an angle which is slightly greater than the desired intersecting angle. One end of the rectangular isosceles member 39 (39A and 39B) is joined with bolts 55 to the end sections of the arms of the letter U of the substrate member 37, while the other end is supported freely by pressing it against the head section of the bolt 49 on the base section of the letter U for the substrate member 37. In order to be supported elastically in suitable manner, the joining surface on both ends of the mirror mounting plate 39A are given chamferings as shown in the FIG. 10. On the joined surface side of the rectangular isosceles member on the mirror mounting plate 39B, there is provided a notch which permits a part of the first reflecting mirror 31 to show itself toward the rear side, as will be described later.

On the mirror mounting plates 39A and 39B there are provided respectively mirror fixing plates 61 that are held by the bolts 59. The mirror mounting plates 39A and 39B hold the reflecting mirrors 31 and 33, respectively, parallel to the mounting plates 39A and 39B by the use of the fixing plates 61.

The mirror supporting device 35 is fixed to the laser housing so as for the reflecting mirrors 31 and 33 to have attitude as shown in FIG. 2 and FIG. 3. In the present example, the fixing units 43 are provided with oblong apertures 51, and the mirror supporting device 35 is arranged to be adjustable for its position along the direction of gas flow Y.

Further, in the mirror supporting device 35 it is possible to give a fine adjustment to the intersecting angle between the first and second reflecting mirrors 31 and 33, in the neighborhood of a predetermined angle (for instance, 90°), within the tolerable range of elastic distortion that occurs in the area of the bolts 53 and 55. The above adjustment can be accomplished by moving the head section of the bolt 49 with respect to the substrate material 37, by varying the engaging positions of the nuts 47 and 47 that are engaged with the bolt 49.

Namely, according to the mirror supporting device 35 of the present embodiment, when there arises a mismatch in the alignment of the primary mirror 25, the output mirror 29, the front folding mirror 27, and so on shown in FIG. 3, it is possible to adjust the mirror alignment by not only changing the angles of these mirrors themselves but also the intersecting angle between the reflecting mirrors 31 and 33 of the rear folding mirror 23. These changes in the mirror angles make it possible to obtain a more appropriate alignment of the optical system. For example, when there occurs a mismatch only in the alignment of the primary mirror 25, from a predetermined angle, what is needed is a slight adjustment of the bolts 49 in the mirror supporting device 35.

What is claimed is:

1. An optical resonator for a laser oscillating apparatus comprising a plurality of mirrors disposed within a hollow cylindrical housing defining a lasing region therein, including a relatively large front folding mirror disposed at the one end of the lasting region, a relatively large rear folding miror disposed at the opposite end of the lasing region, are latively small totally reflective concave primary mirror disposed adjacent the front folding mirror, and a relatively small semi-transmissive output mirror disposed adjacent both the front folding mirror and the primary mirror, the mirrors being angularly disposed with respect to one another so that a ray of radiation is repeatedly reflected through the lasing region, said optical resonator characterized in that the rear folding mirror comprises a pair of plane reflecting mirrors arranged approximately orthogonally to each other and disposed with their reflecting surfaces opposing the front folding mirror, said pair of plane reflecting mirrors mounted on a supporting means that is adjustable to permit relative alignment of the mirror reflecting surfaces at an intersecting angle in the neighborhood of 90°.

2. An optical resonator for laser oscillating apparatus as claimed in claim 1 in which the mirror supporting means is constructed with a rectangular isosceles member with its intersecting angle opened toward the lasting gas medium, and its angle of intersection is made adjustable by elastically supporting a first end of said rectangular isosceles member on a substrate material and moving a second end of said rectangular isosceles member on the substrate material for adjustment.

3. An optical resonator for laser oscillating apparatus as claimed in claim 2 in which the substrate material is constructed so as to be movable in the lateral direction with respect to the lasing gas medium.

4. An optical resonator for laser oscillating apparatus as claimed in claim 2 in which the rectangular isosceles member is constructed by elastically joining two sheets of plate material, the first end of the rectangular isosceles member being elastically fixed to the substrate material with the second end of the rectangular isosceles member being arranged to be movable on said substrate material by pressing said second end to the substrate material by means of appropriate pressing means.

* * * * *